United States Patent
Schwartz et al.

(10) Patent No.: US 11,618,631 B2
(45) Date of Patent: Apr. 4, 2023

(54) BUCKET FOR A BUCKET ELEVATOR

(71) Applicant: BEUMER Group GmbH & Co. KG, Beckum (DE)

(72) Inventors: Adam Von Schwartz, Bochum (DE); Peter Cornelius, Lippetal (DE)

(73) Assignee: BEUMER Group GmbH & Co. KG, Beckum (DE)

( * ) Notice: Subject to any disclaimer, the term of this patent is extended or adjusted under 35 U.S.C. 154(b) by 0 days.

(21) Appl. No.: 17/400,501

(22) Filed: Aug. 12, 2021

(65) Prior Publication Data
US 2022/0063921 A1    Mar. 3, 2022

(30) Foreign Application Priority Data
Aug. 31, 2020    (EP) ..................................... 20193745

(51) Int. Cl.
*B65G 17/36*    (2006.01)
*B65G 17/12*    (2006.01)

(52) U.S. Cl.
CPC ........... *B65G 17/36* (2013.01); *B65G 17/126* (2013.01); *B65G 2201/04* (2013.01)

(58) Field of Classification Search
CPC ... B65G 17/36; B65G 17/126; B65G 2201/04
See application file for complete search history.

(56) References Cited

U.S. PATENT DOCUMENTS

| | | | |
|---|---|---|---|
| 1,944,932 A * | 1/1934 | Weller | B65G 15/44 198/638 |
| 2,122,036 A * | 6/1938 | Lindburg | B65G 17/126 198/713 |
| 2,169,750 A | 8/1939 | Weller | |
| 2,625,830 A * | 1/1953 | Transeau | B65G 17/126 198/712 |
| 4,248,340 A * | 2/1981 | Hild | B65G 17/44 198/711 |
| 7,097,027 B1 * | 8/2006 | Chen | B65G 17/36 198/713 |
| 9,181,038 B1 * | 11/2015 | Niemi | B65G 17/126 |
| 9,205,988 B2 * | 12/2015 | Furthmann | B65G 17/126 |
| 9,371,191 B2 * | 6/2016 | Taylor | B29C 45/0055 |

(Continued)

FOREIGN PATENT DOCUMENTS

| | | | |
|---|---|---|---|
| CN | 209554123 U | 10/2019 | |
| DE | 3802079 C * | 8/1989 | ............. B65G 17/36 |
| EP | 2870084 B1 | 4/2016 | |

(Continued)

*Primary Examiner* — Mark A Deuble
(74) *Attorney, Agent, or Firm* — Harness, Dickey & Pierce, P.L.C.

(57) ABSTRACT

A bucket and a corresponding bucket elevator, the bucket has a bucket wall surrounding a filling and discharge opening and having a rear wall and a front bucket wall, the front bucket wall having a front edge delimiting the filling and discharge opening, and the bucket being connectable to a conveyor device via the rear wall, wherein the ratio between the bucket depth, which corresponds to the horizontal distance between the rear wall and the front edge, and the bucket height, which corresponds to the vertical distance between a bucket low point and the front edge, is greater than 1, preferably greater than 1.3, more preferably greater than 1.5.

14 Claims, 2 Drawing Sheets

(56) References Cited

U.S. PATENT DOCUMENTS 10,131,501 B1 * 11/2018 Kopf ................ A01F 12/46

FOREIGN PATENT DOCUMENTS

| GB | 283214 A | 6/1928 |
|----|----------|--------|
| JP | S50128884 U | 10/1975 |
| JP | H08310631 A | 11/1996 |
| WO | 2014005991 A1 | 1/2014 |

* cited by examiner

BUCKET FOR A BUCKET ELEVATOR

CROSS-REFERENCE TO RELATED APPLICATION

This application claims priority to European Patent Application No. 20193745.5 filed Aug. 31, 2020 as incorporated herein in its entirety.

BACKGROUND OF THE INVENTION

Technical Field

The invention is based on a bucket for a bucket elevator, which has a bucket wall surrounding a filling and discharge opening, which comprises a rear wall and a front bucket wall, the front bucket wall having a front edge delimiting the filling and discharge opening, and the bucket being connectable to a conveyor device via the rear wall. The invention further relates to a corresponding bucket elevator.

Discussion

EP 2 870 084 B1 describes a belt bucket elevator with a driven belt and a plurality of buckets for conveying bulk material. The buckets have a smaller width at their bottom than at the upper end of their sidewalls, which are thereby laterally outwardly flared. At the lower end of their rear wall facing the belt, the buckets also have a projection projecting beyond the bottom of the bucket in the direction of the bucket following in the conveying direction, which projection engages between the sidewalls of the bucket following in the conveying direction projecting beyond the upper edge of the rear wall in the case of buckets standing vertically one above the other and extends sealingly up to the upper edge of the rear wall of the following bucket.

From the publication CN 209554123 U a bucket conveyor is known, which has a plurality of buckets, wherein the bucket comprises a side plate, which is firmly connected to the bucket body, and an arc-shaped bottom. The outside of the bucket is provided with a protective cover, which is connected to the side plate by a bracket.

The buckets known from the prior art have the disadvantage that when the bulk material is ejected from the bucket, they cause on the one hand a high rate of material waste and on the other hand a high degree of dust generation.

SUMMARY OF THE INVENTION

It is therefore the task of the invention to provide a bucket which exhibits improved ejection behavior.

Accordingly, it is proposed that the ratio between the bucket depth, which corresponds to the horizontal distance between the rear wall and the front edge, and the bucket height, which corresponds to the vertical distance between a bucket low point and the front edge, is greater than 1, preferably greater than 1.3, more preferably greater than 1.5.

Due to the particularly flat bucket shape achieved in this way, the bucket exhibits particularly advantageous ejection behavior in that only low centrifugal force is required to effectively eject the material picked up in the bucket. This means that good ejection behavior can be achieved even at low conveying speeds. At the same time, the bucket height is sufficient to prevent premature ejection of bulk material from the bucket, especially while still in the deflection process. The filling and discharge opening can be limited in particular by an edge surrounding and closing the bucket wall. The bucket wall may in particular be formed by metal walls. The bucket wall may comprise at least a rear wall and a front bucket wall, wherein the bucket wall always encloses a bucket body. It may be provided that the filling and discharge opening is the only bucket access. The front edge of the bucket may be a portion of the edge surrounding and terminating the bucket wall. The front edge may be flat with the edge or stepped with respect thereto. The front edge may have a material reinforcement relative to the body of the bucket, for example by a greater thickness or hardened material. The bucket low point is determined in particular by the lowest point of the bucket in the vertical direction. This can be determined by a front bucket wall drawn down to the rear wall or by a base arranged in between.

It may be provided that a tethering device is provided in the rear wall for tethering to a conveyor device, wherein the ratio of the tethering height, which corresponds to the vertical distance between the bucket bottom and the vertical center of the tethering device, and the bucket height is less than 0.6, preferably less than 0.5, particularly preferably less than 0.4.

The bucket 1 can be fixed to the conveyor device 7 by means of the tethering device 9. The tethering device 9 can comprise at least one support section 9a via which the bucket is supported relative to the conveyor device 7. The support section may be raised relative to the rear wall. In particular, the tethering device can be tripartite in its vertical course, with a fastening device 9a for fixing the bucket to the conveyor device and with two support sections 9b and 9c arranged above and below it. Due to the three-part tethering device 9a, 9b, and 9c, the bucket 1 is spaced from the conveyor device 7, by the enlarged thickness or elevations of the support sections 9b and 9c and the attachment point of the bucket at the middle section 9a to the conveyor device 7 is accommodated in the intermediate space formed by the support sections 9b and 9c. The support sections 9b and 9c can be used to prevent material from penetrating between the conveyor device 7 and the back of the bucket 1 and becoming trapped therebetween, in particular during the deflection processes of the bucket 1. This can advantageously minimize wear of the bucket 1 and in particular the belt of the conveyor device 7. The proposed relationship between the tethering height and the bucket height, which reflects the location of the fastening device in the vertical direction measured against the total bucket height or the percentages of the bucket height sections above and below the fastening device, respectively, ensures that the bucket is tied to the conveyor device as low as possible. In addition to the proposed flat bucket design, the low tethering height also results in significantly improved ejection behaviour.

It may further be provided that the average angle of inclination of the front bucket wall is less than 50°, preferably less than 45°, particularly preferably less than 41°.

By providing a flat angle of inclination, in addition to the flat bucket height as well as the low tethering height, the ejection behaviour can also be significantly improved. In particular, it may be provided that the angle of inclination of the portion of the front bucket wall adjacent to the front edge corresponds to the proposed angle of inclination. It may further be provided that the front bucket wall has, at least in sections, the proposed angle of inclination. In particular, it may be provided that the entire front bucket wall has the proposed angle of inclination.

It is conceivable that the bucket further comprises a flat bottom, at least in sections, with the bucket bottom being located in the bottom.

By providing a bottom, it can be advantageously ensured that the bucket has a flat design and at the same time provides a large filling volume. The bottom can be arranged between the front bucket wall and the rear wall and connect them. It may be provided that the entire bottom is of flat design. Alternatively, it may be provided that the base has a shallower angle relative to the front bucket wall. In this case, the bottom portion adjacent to the front bucket wall may slope toward the bottom portion adjacent to the rear wall.

It may further be provided that the bottom is adjacent to the front bucket wall, wherein the bucket may have a bottom edge at the transition between the front bucket wall and the bottom. It may be provided that the front bucket wall has the proposed angle of inclination starting from the bottom edge to the front edge. It may further be provided that, starting from the bottom edge, the bucket bottom extends horizontally to the rear wall. The bottom edge can be arranged vertically below the filling and discharge opening.

Furthermore, it may be provided that the rear wall extends vertically at least in sections, the tethering device being arranged in the rear wall section extending vertically at least in sections. In particular, the vertical rear wall section may be adjacent to the bottom. The vertical rear wall section can have at least the height of the tethering device, comprising the two support sections as well as the fastening device arranged therebetween.

For example, it may be provided that the tethering device comprises at least one row of horizontally spaced bores. The bores may extend between the side elements of the bucket. The bores may be regularly spaced. The connection to the conveyor device may be provided by threaded rods extending in particular from the conveyor device, and corresponding fastening nuts may be provided on the inside of the bucket. It may alternatively be provided that the tethering device comprises a welded connection for connecting the bucket to the conveyor device.

Further, the bucket may include sidewalls connecting the front bucket wall and the rear wall, the sidewalls each having a sidewall upper edge defining the fill opening and the discharge opening. The sidewall upper edges may each be integral portions of the edge surrounding and terminating the bucket wall. At the transition to the front bucket wall, the sidewalls may each have a radius that merges into the front bucket wall. The sidewalls may be flat. Alternatively, the sidewalls may be concave in shape along one or two axes.

In addition, the rear wall can further have a section which is inclined relative to the rear wall section, which runs vertically at least in sections, and which has at its upper end an upper edge bounding the feed and discharge opening. The inclined section can thus adjoin the vertically extending rear wall section, in particular above the latter. The inclined section can serve to direct material exiting the bucket along this section in a direction away from the conveyor. This can further improve the ejection characteristics of the bucket. On the one hand, this can reduce the fallback of material. On the other hand, material that has fallen between the inclined section and the conveyor device can escape more easily due to the inclination.

It may be provided that the angle of inclination of the inclined section relative to the rear wall section, which is vertical at least in sections, is greater than 15°, preferably greater than 18°, particularly preferably greater than 20°. It may further be provided that the angle of inclination of the inclined section corresponds to the angle of inclination of the front bucket wall, so that they are arranged parallel to one another.

Furthermore, it is conceivable that at least one of the sidewall upper edges has, at least in sections, an angle of inclination of between 7° and 11°, preferably between 8° and 10°, particularly preferably of 9°. In particular, both sidewall upper edges may have the proposed angle of inclination. In particular, the inclination of the upper edge of the sidewall may increase towards the rear wall of the bucket so that the lowest point is at the front edge of the bucket. Accordingly, the highest point of the bucket may be at the top of the inclined back wall section. On the one hand, the inclined upper edge of the sidewall increases the filling volume of the bucket. On the other hand, during ejection, escape of the material at the front of the bucket is favored or prevented at the rear of the bucket.

A bucket elevator is further proposed in which a bucket is fixed to a conveyor device of the bucket elevator via a tethering device, the filling and discharge opening being aligned in the direction of movement of the conveyor device. In particular, the bucket elevator can have a circulating, endless conveyor device. The bucket elevator can have a plurality of buckets, each with filling and discharge openings aligned in the direction of movement of the conveyor device.

The bucket elevator may have a conveyor that includes a belt or chain.

In particular, it may be provided that the conveyor device has a inclination and, in particular, is oriented vertically, the bucket elevator further having two deflection devices around which the conveyor device is deflected. The bucket elevator may have a feed point at a lower end of the conveyor device and a discharge point at an upper end of the conveyor device. Alternatively, the bucket elevator may have multiple fill locations. The filling point may be located on the side of the conveyor with the filling and discharge openings oriented upward. The ejection point may be arranged on the side of the conveyor device with downwardly aligned filling and discharge openings.

The conveying speed of the conveyor device can be selected in such a way that during the ejection process the resultant of the weight force and the centrifugal force essentially corresponds to the mean angle of inclination of the front bucket wall. The resultant can be located in the expected center of mass of the material of an average filled bucket. The conveying speed can correspond to the belt speed.

BRIEF DESCRIPTION OF THE DRAWINGS

Further features, advantages and characteristics of the invention can be seen in the following description of preferred embodiments of the invention with reference to the accompanying drawings, in which show.

DESCRIPTION OF THE PREFERRED EMBODIMENTS

Figure 1:
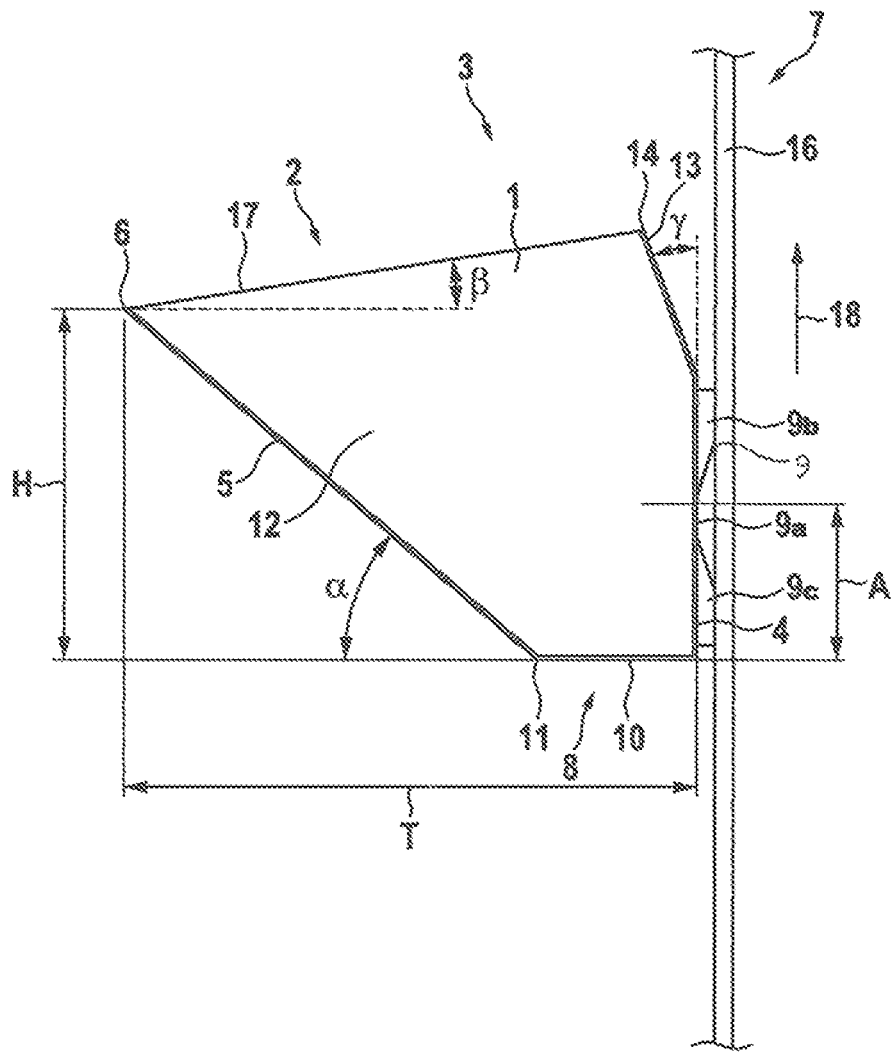
FIG. 1 is a side view of an embodiment of a bucket according to the invention.

FIG. 1 shows a bucket 1 according to the invention, which has a bucket wall 3 with a front bucket wall 5, a rear wall 4, sidewalls 12 connecting the front bucket wall 5 and the rear wall 4, and a base 10. The bucket 1 is tethered to a belt 16 of a conveyor device via a tethering device 9, which has a vertically upwardly directed direction of movement 18. On its upper side, the bucket 1 has a filling and discharge opening 2, which is formed by an edge closing the bucket wall 3 towards the top. The edge has several sections. Here, the front edge 6 is associated with the front bucket wall 5 and forms the frontmost point of the bucket 1, which is thus furthest away from the conveyor device 7. Sidewalls 12 each have sidewall upper edges 17, which laterally delimit the filling and discharge opening 2. The rear wall 4 has an upper edge 14 which limits the filling and discharge opening 2 at the rear. In the embodiment shown, the upper edge 14 forms the highest point of the bucket 1. The tethering device 9 has three sections in the vertical direction, which are arranged on a vertically extending section of the rear wall 4. A fastening device for fastening the bucket 1 to the belt 16 of the conveyor device 7 is provided centrally. Above and below the fastening device, raised support sections are provided which space the bucket 1 and the rear wall 4, respectively, from the belt 16 by a distance. Above the vertical rear wall section, the rear wall 4 has an inclined section 13 which inclines by an angle γ with respect to the vertical one in the direction of the front of the bucket and is bounded at its upper side by the upper edge 14. The upper edges 17 of the sidewall adjacent thereto slope towards the front edge 6 by an angle β with respect to the horizontal. Adjacent to the rear wall 4 as well as adjacent to the front bucket wall 5, the horizontal bottom 10 is arranged therebetween. A bottom edge 11 is arranged in the transition between the base 10 and the front bucket wall 5. In the illustrated embodiment, the base is horizontal and, as the lowest positioned element, forms the bucket low point 8. Between the bottom edge 11 and the front edge 6, the front bucket wall 5 rises at an angle α to the horizontal.

The vertical distance between the front edge 6 and the bucket low point 8, i.e. the base 10 in the example shown, represents the bucket height H. The bucket depth T corresponds to the horizontal distance between the front edge 6 and the vertical section of the rear wall 4. The bucket depth T corresponds to the horizontal distance between the front edge 6 and the vertical section of the rear wall 4. The tethering height A corresponds to the vertical distance between the bucket low point 8 and the central point of the tethering device 9 in vertical dimension, in which the fastening device is arranged in the example shown.

Figure 2:
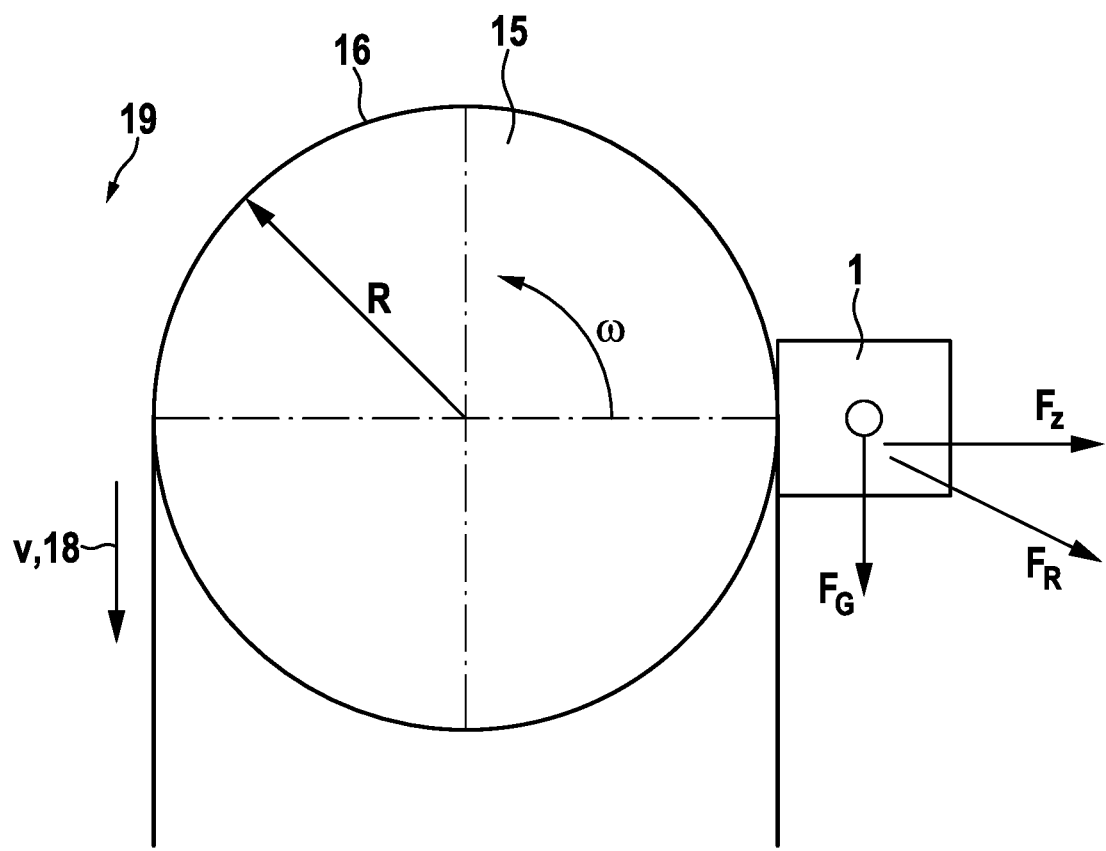
FIG. 2 is a schematic representation of the forces acting on the bucket contents during ejection.

FIG. 2 shows an example of a bucket elevator with a bucket 1, which is located in the direction of movement 18 shortly before a deflection device, behind which an ejection point is arranged. The bucket contents are subjected to the weight force $F_G$ and the centrifugal force $F_Z$ during deflection. The belt 16 of the conveyor device 7 moves at a conveying speed v and the deflection roller, having a radius R, moves correspondingly at an angular speed ω. The conveying speed v of the belt 16 is now set exactly so that at the ejection point 19 the resultant $F_{R\ of\ the}$ forces $F_Z$ and $F_G$ corresponds to the angle of inclination α of the front bucket wall 5, so that the ejection takes place without rebound and dust formation.

The features of the invention disclosed in the foregoing description, in the drawings as well as in the claims may be essential to the realization of the invention both individually and in any combination.

LIST OF REFERENCE SIGNS

1 Bucket
2 Filling and discharge opening
3 Bucket wall
4 Back wall
5 Front bucket wall
6 Front edge
7 Conveyor device
8 Bucket low point
9 Tethering device
10 Bottom
11 Bottom edge
12 Sidewall
13 Inclined section
14 Upper edge
15 Deflection device
16 Belt
17 Upper edge of sidewall
18 Direction of movement
19 Ejection point
$F_Z$ Centrifugal force
$F_G$ Weight
$F_R$ Resultant
A Tethering height
H Bucket height
T Bucket depth
R Radius of Deflection device
v Conveying speed
α Angle of inclination
β Angle of inclination
γ Angle of inclination
ω Angular velocity

The invention claimed is:

1. A bucket (1) for a bucket elevator, comprising a bucket wall (3) surrounding a filling and discharge opening (2), a rear wall (4) and a front bucket wall (5), the front bucket wall (5) having a front edge (6) delimiting the filling and discharge opening (2), and the bucket (1) being connectable to a conveyor device (7) via the rear wall (4), wherein a ratio between a bucket depth (T), which corresponds to the horizontal distance between the rear wall (4) and the front edge (6), and a bucket height (H), which corresponds to the vertical distance between a bucket low point (8) and the front edge (6), is greater than 1; and
   wherein a tethering device (9) is provided for tethering to a conveyor device (7), wherein a ratio of a tethering height (A), which corresponds to a vertical distance between the bucket low point (8) and a vertical center of the tethering device (9), and the bucket height (H) is less than 0.5,
   wherein the tethering device (9) has three sections including a middle section (9a) an upper section (9b) and lower section (9c) in its vertical direction, the upper and lower sections being of increased thickness to space the rear wall (4) of the bucket (1) from a belt (16) of the conveying device (7), the middle section having a fastening device for fixing the bucket to the belt of the conveyor device.

2. The bucket (1) according to claim 1, wherein an average angle of inclination (α) of the front bucket wall (5) is smaller than 50°.

3. The bucket (1) according to claim 1, wherein the bucket (1) further comprises an at least partially flat bottom (10), wherein the bucket low point (8) is located in the bottom (10).

4. The bucket (1) according to claim 3, wherein the bottom (10) is adjacent to the front bucket wall (5), wherein the bucket (1) has a bottom edge (11) in the transition between the front bucket wall (5) and the bottom (10).

5. The bucket (1) according to claim 1, wherein the rear wall (4) extends vertically at least in sections, wherein the tethering device (9) is arranged in the rear wall section extending vertically at least in sections.

6. The bucket (1) of claim 5, wherein the tethering device (9) comprises at least one row of horizontally spaced bores.

7. The bucket (1) according to claim 1, further comprising sidewalls (12) connecting the front bucket wall (5) and the rear wall (4), the sidewalls each having a sidewall upper edge (17) defining the filling and discharge opening (2).

8. The bucket according to claim 7, wherein the rear wall further comprises a section (13) inclined with respect to the rear wall section extending vertically at least in sections, which section comprises at its upper end an upper edge (14) defining the filling and discharge opening (2).

9. The bucket (1) according to claim 8, wherein the angle of inclination (3) of an inclined section (13) relative to the back wall portion extending vertically at least in portions is greater than 15°.

10. The bucket (1) according to claim 7, wherein at least one of the sidewall upper edges (17) has, at least in sections, an angle of inclination ($\beta$) of between 7° and 11°.

11. A bucket elevator with at least one bucket according to claim 1, which is fixed to a conveyor device (7) of the bucket elevator by a tethering device (9), wherein the filling and discharge opening (2) is aligned in the direction of movement (18) of the conveyor device (7).

12. The bucket elevator of claim 11, wherein the conveyor (7) comprises a belt (16) or chain.

13. The bucket elevator according to claim 11, wherein the conveyor device (7) has an inclination and is oriented vertically, wherein the bucket elevator further comprises two deflection devices (15) around which the conveyor device (7) is deflected.

14. Bucket elevator according to claim 13, wherein the conveying speed (v) of the conveyor device (7) is selected such that, during the ejection process, the resultant of the weight force ($F_G$) and the centrifugal force ($F_Z$) substantially corresponds to the mean angle of inclination (a) of the front bucket wall (5).

* * * * *